(12) United States Patent
Chen et al.

(10) Patent No.: US 7,741,252 B2
(45) Date of Patent: Jun. 22, 2010

(54) SURFACTANTS NOT TOXIC TO BACTERIA

(75) Inventors: Yiyan Chen, Richmond, TX (US);
Richard Marcinew, Calgary (CA);
Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 235 days.

(21) Appl. No.: 11/609,137

(22) Filed: Dec. 11, 2006

(65) Prior Publication Data

US 2008/0051301 A1  Feb. 28, 2008

Related U.S. Application Data

(60) Provisional application No. 60/821,627, filed on Aug. 7, 2006.

(51) Int. Cl.
*C23F 11/14* (2006.01)
*C09K 8/584* (2006.01)
(52) U.S. Cl. .............. 507/244; 507/202; 507/240; 507/241; 507/256; 507/260; 507/267; 507/269
(58) Field of Classification Search ............ None
See application file for complete search history.

(56) References Cited

U.S. PATENT DOCUMENTS

| 6,258,859 | B1 | 7/2001 | Dahayanake |
| 6,703,352 | B2 | 3/2004 | Dahayanake |
| 2002/0076803 | A1 | 6/2002 | Crews |
| 2002/0147114 | A1 | 10/2002 | Dobson |
| 2005/0067165 | A1 | 3/2005 | Cawiezel |
| 2005/0137095 | A1 | 6/2005 | Cawiezel |
| 2006/0111248 | A1 | 5/2006 | Lee |
| 2006/0128597 | A1 | 6/2006 | Chen |
| 2006/0128598 | A1 | 6/2006 | Chen |
| 2006/0148660 | A1 | 7/2006 | Chen |

FOREIGN PATENT DOCUMENTS

WO    WO 9856497 A1  * 12/1998

* cited by examiner

*Primary Examiner*—James Seidleck
*Assistant Examiner*—John J Figueroa
(74) *Attorney, Agent, or Firm*—Martin Rzaniak; David Cate; Robin Nava

(57) ABSTRACT

An oilfield treatment method is given that uses fluids that contain surfactants used as foamers and/or viscosifiers such that the fluids pass the Alberta Energy and Utilities Board Directive 27 requirements for low toxicity to certain bioluminescent bacteria. Such fluids may be used in oilfield treatments, for example drilling and stimulation, near fresh water aquifers. The surfactants are certain non-ionic surfactants that are not aromatic, or certain amphoteric surfactants (that can be neutral), or certain zwitterionic surfactants, (in which both positive and negative charges are present in a single molecule so that the whole molecule is neutral).

14 Claims, No Drawings

SURFACTANTS NOT TOXIC TO BACTERIA

This application claims the benefit of U.S. Provisional Patent Application No. 60/821,627, filed on Aug. 7, 2006.

BACKGROUND OF THE INVENTION

The invention relates to foamed or surfactant fluid systems (VES's) that are applied in various applications of the oil industry, providing a degree of biodegradability, and meeting the requirements of Alberta Energy and Utilities Board Directive 27, in that they pass a test of their toxicity to light emitting bacteria.

New Alberta Energy and Utilities Board Directive 27 requirements (that require following Alberta Energy and Utilities Board Guide 50 "Drilling Waste Management") put restrictions on the use of oilfield fluids in wells, such as those penetrating shallow gas reservoirs, where the potential exists for fluids to contaminate fresh-water aquifers and water wells, if hydraulic communication is inadvertently established. The Directive requires that any fluid pumped must pass the bacterium toxicity test protocol of Guide 50, similar to that used for qualifying drilling and other fluids for land surface disposal. In this test, bioluminescent bacteria are added to the as-pumped fluid. The sample is aged for a limited amount of time, and the inhibition of the natural bioluminescence of the sample is measured. If the EC50 is >75%, the fluid passes; otherwise it fails. EC50 is the relative sample concentration (in dilution water) required to decrease light output by 50%. A sample with a value of EC50 of 10% means that a sample concentration of 10% in dilution water lowers the light output of the microorganisms by 50%. Most hydraulic fracturing fluids that are viscosified with viscoelastic surfactants, or that contain foamers and/or other additives, for example fracture fluids used in friction-reduced water (slickwater) treatments (using high fracture volumes, pump rates, and pressures) can not pass this test. This test is well known to those of skill in the art. It uses Microtox® reagents (supplied by AZUR Environmental, Carlsbad, Calif., U.S.A.) which are the freeze dried (lyophilized) luminescent bacterium *Photobacterium phosphoreum* (marine water organisms, strain NRRL B-11177).

SUMMARY OF THE INVENTION

We have developed fluids that contain surfactants/foamers that can pass the test, and/or that are viscosified with certain viscoelastic surfactants that can pass the test. An embodiment of the Invention is an oilfield treatment method including the steps of: (a) providing a fluid containing a surfactant selected from the group consisting of zwitterionic surfactants, amphoteric surfactants, non-ionic surfactants that are not aromatic, and mixtures thereof, and (b) injecting the fluid down a well; the fluid must pass the toxicity test according to the Alberta Energy and Utilities Board Guide G50, 1996, (Directive 050) for Drilling Waste Management. In various aspects of the method of the Invention, the method further includes generating a foam from the fluid; the concentration of the of the active component of the surfactant in the liquid phase of the foam is from about 0.004 to about 2.4 weight %, for example from about 0.008 to about 1 weight %; the surfactant is in a concentration sufficient to impart additional viscosity to the fluid; the surfactant is in a concentration sufficient to impart viscoelasticity to the fluid; the fluid further contains a viscosifying amount of a water soluble polymer; the fluid further contains a foam stabilizer; the surfactant is a zwitterionic surfactant; the zwitterionic surfactant includes a surfactant or mixture of surfactants having the formula:

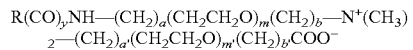

in which R is an alkyl group that contains from about 7 to about 25 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; y is 1 or 0; and $CH_2CH_2O$ may also be $OCH_2CH_2$; and if the surfactant is used as a foaming agent and R is an alkyl group that contains from about 7 to about 17 carbon atoms which may be branched or straight chained and which may be saturated or unsaturated. In further embodiments, the zwitterionic surfactant has the betaine structure:

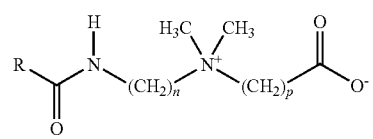

in which R is a hydrocarbon group that may be branched or straight chained, aromatic, aliphatic or olefinic and has from about 7 to about 25 carbon atoms and may contain an amine; n=about 2 to about 4; and p=1 to about 5, and mixtures of these compounds. The betaine may be for example, oleylamidopropyl betaine, erucylamidopropyl betaine, or cocoamidopropyl betaine and the fluid may contain a co-surfactant. The surfactant may be a sultaine, a lecithin phospholipids, may be selected from ethylene oxide-propylene oxide-ethylene oxide and propylene oxide-ethylene oxide-propylene oxide triblock polymers, and may be selected from poly (ethyelene oxide) substituted alkyl compounds. The fluid may also contain a rheology enhancer, and/or and acid selected from hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and mixtures of those acids. The fluid may also contain a breaker for the surfactant. The concentration of the of the active component of the surfactant in the fluid is from about 0.004 to about 2.4 weight %, for example from about 0.008 to about 1 weight %. The fluid may be energized.

DETAILED DESCRIPTION OF THE INVENTION

Water-based hydraulic fracturing fluids (fresh water, reservoir-produced brines or formulated mixtures) can be 1) non-viscosified, or viscosified with a polymer, with an added foaming agent or surfactant for surface/interfacial tension reduction; or 2) viscosified with a viscoelastic surfactant that is itself a foaming agent. Unfortunately, most surfactants that can be used for either purpose cannot pass the specific toxicity test criteria described. We have found that certain surfactants, especially certain zwitterionic surfactants, most specifically certain betaines and sulfobetaines (also called sultaines) are suitable for use as surfactants or foamers for water, brine, or polymer-based friction-reduced (slickwater) fluids, and pass the toxicity test. Some of these surfactants, at sufficient concentrations, may also be used in the formulation of viscoelastic surfactant-based viscosified fluids. When used as surface and interfacial-tension reducers or foamers, they are usually used at concentrations below those necessary to form micelles of sufficient structure to provide viscosity.

When the surfactants of the Invention are used in polymer-based fluids, the polymers may be any of the polymers conventionally used to viscosify oilfield fluids. They may be polysaccharides, such as guars, celluloses, xanthans, and diutans. They may be derivatized, for example carboxymethyl substituted, or quaternary amine substituted. They may be synthetic, for example polyacrylamides. They may be complexed/crosslinked, for example with crosslinkers based on boron, titanium, aluminum, and zirconium. The fluids may also contain any of the additives used in such fluids, such as anti-sludge agents, clay stabilizers, anti-oxidants, buffers, etc., provided that such additives are tested to ensure that they are not toxic to the bacteria.

Certain zwitterionic surfactants have been found to be particularly effective. In general, particularly suitable zwitterionic surfactants, for use in making fluids of the Invention, have the formula:

RCONH—$(CH_2)_a(CH_2CH(CH_3)O)_x(CH_2CH_2O)_m$
$(CH_2)_b$—$N^+(CH_3)_2$—$(CH_2)_{a'}(CH_2CH_2O)_{m'}$
$(CH_2)_{b'}COO^-$ in which R is an alkyl group that contains from about 11 to about 25 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; x is from 0 to about 13; and $CH_2CH_2O$ may also be $OCH_2CH_2$. If the zwitterionic surfactant is being used as a foamer but not as a viscoelastic surfactant, the R group may also contain from about 7 to about 10 carbon atoms and is preferably from about 7 to about 17 carbon atoms. Analogous compounds (sultaines) having the —COO⁻ replaced with —SO3⁻ are also suitable.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. The surfactant in BET-E-40 is also shown below; one chemical name is erucylamidopropyl betaine. Another betaine that is suitable is cocoamidopropyl betaine, which is a natural mixture of primarily $C_{12}$ and $C_{14}$ betaines with n=3 and p=1, as in the structure immediately below. BET surfactants, and other VES's that are suitable for the present Invention, are described in U.S. Pat. No. 6,258,859, hereby incorporated in its entirety. According to that patent, BET surfactants, at sufficient concentration, make viscoelastic gels when in the presence of certain organic acids, organic acid salts, or inorganic salts; in that patent, the inorganic salts were present at a concentration up to about 30 weight % of the liquid portion of the system.

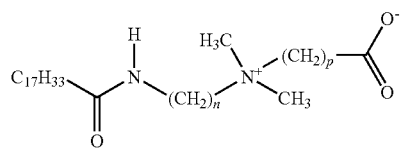

Surfactant in BET-O-30 (when n = 3 and p = 1)

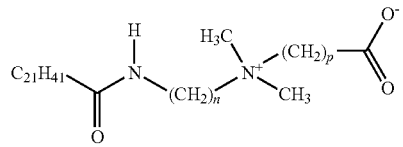

Surfactant in BET-E-40 (when n = 3 and p = 1)

Preferred embodiments of the present invention use betaines; most preferred embodiments use BET-E-40. Although experiments have not been performed, it is believed that mixtures of betaines are also suitable. Such mixtures are within the scope of embodiments of the invention.

Other betaines that are suitable as surfactants of the Invention include those in which the alkene side chain (tail group) contains 11-25 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. If the betaine surfactant is being used as a foamer but not as a viscoelastic surfactant, the R group may also contain from about 7 to about 10 carbon atoms and is preferably from about 7 to about 17 carbon atoms. These surfactants are used at a concentration of about 0.004 to about 2.4 weight %, preferably from about 0.008 to about 1 weight % (concentration, in the liquid phase of the treatment fluid foam, of the active component of the surfactant concentrate). (It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.)

Compounds analogous to these betaines, but having the —COO⁻ group replaced with —SO3⁻ are also suitable; these are called sulfobetaines or sultaines. Other suitable compounds include lecithin phospholipids, for example phosphatidylcholines. Other suitable surfactants include anionic surfactants having ammonium counterions, for example $RCOONH_4$. As usual, laboratory tests should be run to ensure that specific surfactants in suitable concentrations and with necessary additives give fluids that pass the toxicity test.

The fluids of the invention may contain certain other additives, such as the "rheology enhancers" disclosed in U.S. patent application Ser. Nos. 10/994,664, 11/249,233 and 11/334158, (all three of which are assigned to the assignee of the present application and are hereby incorporated in their entirety) that may also be used to stabilize foams made with the surfactants of the Invention, especially at low surfactant concentrations. The use of these materials allows foams to be made from these surfactants that both require lower surfactant concentrations in the liquid phase of the foam (and thus much less total surfactant) and provide foam stability at higher temperatures. Although in the context of the current invention, these materials are "foam stability enhancers," we will call them "rheology enhancers". If fluid fails the toxicity test by a slight amount, it is possible to add a rheology enhancer so that the required surfactant concentration is reduced and the fluid passes the test.

Certain amphoteric surfactants are also suitable as surfactants (including viscoelastic surfactants) or foamers of the Invention, provided that they are neutrally charged under the conditions of use. Exemplary amphoteric surfactant systems include those described in U.S. Pat. No. 6,703,352, hereby incorporated in it's entirety. Other exemplary surfactant systems include those described in U.S. Patent Application Nos. 2002/0147114, 2005/0067165, and 2005/0137095, all three of which are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide (these are weight percents of a concentrate used to make the final fluid). It should be kept in mind that some of these surfactants may be toxic to the bacteria in other ways even if they do not affect bacteria membranes (see below), in which case they might pass this specific toxicity test but not be suitable in certain locales because of other forms of toxicity.

Viscoelastic surfactant fluids or foamed or energized fluids, of the Invention, for example those used in the oilfield, may also contain agents that dissolve minerals and other compounds, for example in formations, scale, and filtercakes. Such agents may be, for example, hydrochloric acid, hydrogen fluoride, hydrogen fluoride sources such as ammonium fluoride and ammonium bifluoride, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, and salts of these acids and mixtures of these acids and/or salts. However, it must be understood that many of these additives are themselves harmful to bacteria above certain concentrations and would not pass the test if they were present in the fluid above those concentrations, so fluids that contain them must be tested, and only fluids containing these additives that pass the test are suitable for the Invention.

Preparation and use (mixing, storing, pumping, etc.) of the improved foamed and/or viscoelastic surfactant fluid systems of the invention are those conventionally used in the field. For example, the order of mixing of the components in the liquid phase is not affected by using these fluids. As is normally the case in fluid formulation, laboratory tests should be run to ensure that additives do not affect the ability of the fluid to pass the toxicity test.

The foams may also be made in any way, for example the ways used in the oilfield. As usual, foaming methods, the possible need for foaming agents, and compatibilities should be checked in the laboratory. The preferred gas is nitrogen, although other gases, including mixtures, may be used. The foam quality (FQ, or volume percent gas phase in the foam) is preferably from about 55 to about 80%, for example about 75%. Nitrogen is the preferred foaming agent; methane and carbon dioxide may be used if they are compatible with the specific foaming agent. The fluid may be energized with these gases rather than foamed.

The fluid is particularly suitable for, but not limited to, the types of friction-reduced water jobs discussed above. Other uses, or variations, fall within the scope of the Invention. They can function in numerous applications including, but not limited to, subterranean well treatment applications (such as drilling, solids removal and well-bore cleanout (including cleanout with coiled tubing, and cleanout of coal solids from shallow horizontal and vertical wells (even if there had not been a fracturing treatment)), hydraulic fracturing, reservoir stimulation, and sand/solids control and workover operations) in locations in which the test must be passed on injected and/or produced fluids. In applications where drilling, completion and workover fluids are formulated with the intent of future surface land-spreading and disposal, or where local environmental requirements (such as proximity to protected areas, certain wild-life habitats, or fresh water sources) dictate that these fluids meet minimum biodegradation criteria, they are required to pass test protocols such as outlined in the previously discussed Drilling and Waste Management Guide 50. These are additional applications of the surfactant technology describe herein. The surfactants may be used to formulate viscoelastic drilling, workover, or completion fluids with rheological properties sufficient to carry solids for drilling, or removing well-bore solids/debris (from the reservoir/formation, bridging/lost-circulation materials, proppants, pipe-dope, temporary gels, cements, fibers, or any others artificially placed within), and other deposits such as scales, through circulation techniques for the purpose of removal. The surfactants may also be used as admixtures to existing formulations for the purpose of improving performance and compatibility of the drilling and work-over fluids with solids and/or reservoir fluids. They may be used as foamers or surface-tension reducers, in energized or non-energized fluid systems. This surfactant chemistry may also be applied to providing an acceptable, biodegradable, and non-damaging completion fluid for the purpose of well pressure control during various well completion and workover operations, or as a complementary fluid for well stimulation operations. Applications also include sand control placement operations (either combined with hydraulic fracturing, or in conventional gravel-pack operations) where fluids disposal and environmental control concerns exist; these may be offshore or land applications. Other examples are CoalBed Methane fracturing and fracturing of shale reservoirs. The fluids may provide direct atmospheric flowback of fracture treatment water without the need for special collection and disposal procedures. Additionally, the surfactant-containing fluids may be extended to surface applications where similar fluid behavior, and biodegradation criteria are required (for example separation of tar-sands solids from bitumen, or to other surface operations where a surfactant fluid is required to assist solids or immiscible fluids separation.

The optimal concentration of surfactant for a given choice of VES and/or foamer at a given concentration and temperature, with given other materials present, and for a given foam quality, can be determined by simple experiments. Again, tolerance for, and optimal amounts of other additives may also be determined by simple experiment. In general, the amount of surfactant is from about 0.004 to about 2.4 weight %, preferably from about 0.008 to about 1 weight % (concentration, in the treatment fluid or in the liquid phase of the treatment fluid foam, of the active component of the surfactant concentrate). Commercially available surfactant concentrates may contain certain materials that may cause failure of the toxicity test, so they must be tested. Mixtures of surfactants may be used.

Experimental: The present invention can be further understood from the following examples. The concentrations given for the surfactants are for the as-received concentrates; all concentrations are weight % unless otherwise noted. G50 Microtox tests were performed by HydroQual Laboratories, Ltd., Calgary, Alberta, Canada. The tests determine toxicity according to the Alberta Energy and Utilities Board Guide G50, 1996, (Directive 050) for Drilling Waste Management, as explained above. Tests were conducted on the following fluids:

1) Slickwater A (2% KCl; 0.1% of a mixture of approximately 5-10% ethylene glycol, 1-5% ammonium chloride, 20-50% heavy aliphatic petroleum naphtha, 1-5% glycol ether/surfactant blend, and 20-50% cationic polyacrylamide; 0.2% of a solution of approximately 12.5% decyl-dimethyl amine oxide; in water)
2) Slickwater C (2% KCl; 2.4 l/m$^3$ of a slurry of about 50% guar in hydrotreated light petroleum distillates; 0.2% of a solution of approximately 12.5% decyl-dimethyl amine oxide; in water)
3) Slickwater Cb (2% KCl; 1.2 kg/m$^3$ of guar containing about 7.5% water; 0.2% of a solution of approximately 12.5% decyl-dimethyl amine oxide; in water)
4) 2% KCL; 0.5% of a mixture of approximately 13% ethanol, 15% ethylene glycol monobutyl ether, and 25-51% ammonium C6-C10 alcohol ethoxysulfate; in water
5) 2% KCL; 0.5% of a mixture of approximately 40-70% water, 10-20% isopropanol, and 25-35% amphoteric alkyl amine; in water
6) 1% KCl; 1% of a mixture of approximately 20-60% quaternary ammonium compounds, 10-30% alkylaryl sulfonate, <7.5% propane-1,2-diol, 17-21% isopropanol, and 20% water; in water
7) 2% KCl; 1% of a mixture of approximately 20-60% quaternary ammonium compounds, 10-30% alkylaryl sulfonate, <7.5% propane-1,2-diol, 17-21% isopropanol, and 20% water; in water
8) 2% KCl; 1% of a mixture of approximately 22% isopropanol, 6% sodium chloride, 39% erucic amidopropyl dimethyl betaine, and 31-33% water; 0.25% of a mixture of approximately 20% in water of a copolymer containing polyvinyl acetate that is approximately 42-45% hydrolyzed, having an average molecular weight of about 25,000; in water
9) 1% of a mixture of approximately 22% isopropanol, 6% sodium chloride, 39% erucic amidopropyl dimethyl betaine, and 31-33% water; 0.25% of a mixture of approximately 20% in water of a copolymer containing polyvinyl acetate that is approximately 42-45% hydrolyzed, having an average molecular weight of about 25,000; in water
10) Slickwater E (2% KCl; 0.1% of a mixture of approximately 5-10% ethylene glycol, 1-5% ammonium chloride, 20-50% heavy aliphatic petroleum naphtha, 1-5% glycol ether/surfactant blend, and 20-50% cationic polyacrylamide; 0.2% of a mixture of approximately 22% isopropanol, 6% sodium chloride, 39% erucic amidopropyl dimethyl betaine, and 31-33% water).

Of the above 10 fluids, the first 7 had EC50 values of no more than 1.5% and so they failed the test. The last three fluids had EC50 values of greater than 91% and so they more than passed the test.

Not shown were additional tests in which it was found that:
a) Betaines (for example Mirataine CB) were better than sultaines (for example Mirataine CBS) (both from Rhodia, Inc. Cranbury, N.J., U.S.A.)
b) saturated betaines (for example Mirataine BB) were worse than unsaturated betaines (for example Mirataine CB) (both from Rhodia, Inc. Cranbury, N.J., U.S.A.)
c) Ethylene oxide-propylene oxide-ethylene oxide (for example Antarox p-84) and propylene oxide-ethylene oxide-propylene oxide (for example Antarox 17-R-2) (both from Rhodia, Inc. Cranbury, N.J., U.S.A.) triblock polymers showed EC50 values of 41% and 39% respectively when used at 0.5% concentrations in 2% KCl. It is clear that when used as foamers such materials would pass the test when used at slightly lower concentrations.
d) Ethylene oxide-propylene oxide diblock polymers (such as Antarox BL-214 (from Rhodia, Inc. Cranbury, N.J., U.S.A.) did very poorly in the test.
e) A poly(ethyelene oxide) substituted alkyl (Rhodasurf LA-3 from Rhodia, Inc. Cranbury, N.J., U.S.A.) showed an EC50 value of 20% when used at 0.5% concentration in 2% KCl. It is believed that when used as foamers such materials would pass the test when used at lower concentrations.
f) Sodium laureth carboxylate (Miranate LEC) and sodium laureth-3-sulfate (Rhodapex ES) (both from Rhodia, Inc. Cranbury, N.J., U.S.A.) when used at 0.5% concentration in 2% KCl gave EX50 values less than 1%. These are believed to be unsuitable because they are negatively charged under most conditions.
g) Disodium lauroamphodiacetates (such as Miranol BM and Miranol H2M (both from Rhodia, Inc. Cranbury, N.J., U.S.A.)) when used at 0.5% concentration in 2% KCl gave EX50 values less than of 2.5 to 3%. These are believed to be unsuitable because they are negatively charged under most conditions.
h) Amine oxides would not pass because of the toxic amine oxide functional group.

Not to be limited by theory, but it is believed that a bacterium membrane must be maintained at its optimum equilibrium. Even if the additive is not toxic to a bacterium, the osmotic pressure of the bacteria's membranes can be adversely affected by some chemicals, especially most charged surfactants.

Again, not to be limited by theory, suitable surfactants of the Invention are non-ionic surfactants that are not aromatic, amphoteric surfactants (that can be neutral), and zwitterionic surfactants, (in which both positive and negative charges are present in a single molecule so that the whole molecule is neutral); these are not likely to affect the osmotic pressure at the membrane and thus will not alter the bacterium structure and chemical balance. The bacteria are thus kept alive and active. Furthermore, the surfactants of the Invention are generally not acutely toxic and are biodegradable and non-bioaccumulative; they are therefore more "environmentally friendly" than other oilfield, such as most quaternary amine compounds.

Surfactants that are not suitable are those that are charged under the conditions of use (such as the acetates and diacetates). Zwitterionics containing sulfonates are believed to be less suitable that zwitterionics containing carbonates because of the former have stronger localized charges.

What is claimed is:
1. An oilfield treatment method, comprising:
providing a slickwater treatment fluid comprising a polymer-based friction-reducer and a betaine zwitterionic surfactant that allows the slickwater treatment fluid to pass the toxicity test according to the Alberta Energy and Utilities Board Guide G50, 1996, (Directive 050) for Drilling Waste Management wherein said betaine comprises erucylamidopropyl betaine or cocoamidopropyl betaine, wherein the concentration of the active component of the surfactant in the fluid is from about 0.004 to about 2.4 weight %; and injecting the slickwater treatment fluid down a well.

2. The method of claim 1 further comprising generating a foam from said fluid.

3. The method of claim 2 wherein the concentration of the active component of the surfactant in the liquid phase of the foam is from about 0.004 to about 2.4 weight %.

4. The method of claim 3 wherein the concentration of the active component of the surfactant in the liquid phase of the foam is from about 0.008 to about 1 weight %.

5. The method of claim 1 wherein the surfactant is in a concentration sufficient to impart additional viscosity to the fluid.

6. The method of claim 1 wherein the surfactant is in a concentration sufficient to impart viscoelasticity to the fluid.

7. The method of claim 1 wherein the treatment fluid comprises a viscosifying amount of a water soluble polymer.

8. The method of claim 1 wherein the fluid further comprises a foam stabilizer.

9. The method of claim 1 wherein said fluid further comprises a co-surfactant.

10. The method of claim 1 wherein the treatment fluid comprises a rheology enhancer.

11. The method of claim 1 wherein the treatment fluid comprises an acid selected from the group consisting of hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and mixtures thereof.

12. The method of claim 1 wherein the fluid further comprises a breaker for the surfactant.

13. The method of claim 1 wherein the concentration of the active component of the surfactant in the fluid is from about 0.008 to about 1 weight %.

14. The method of claim 1 wherein the fluid is energized.

* * * * *